UNITED STATES PATENT OFFICE.

PAUL FISCHER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

938,565.  Specification of Letters Patent.  Patented Nov. 2, 1909.

No Drawing.  Application filed April 22, 1909. Serial No. 491,500.

*To all whom it may concern:*

Be it known that I, PAUL FISCHER, doctor of philosophy, chemist, citizen of the German Empire, residing at Elberfeld, Germany, have invented new and useful Improvements in New Vat Dyes, of which the following is a specification.

In an application for Letters Patent Serial No. 489,786, dated April 14th, 1909 I have described the production of vat-dyestuffs of the anthracene series which are obtained by condensing succinic acid with two molecules of an aminoanthraquinone. I have now found that dyestuffs possessing similar valuable dyeing properties are obtained by condensing other dicarboxylic acids with an aminoanthraquinone, one molecule of the acids entering into combination with two molecules of the aminoanthraquinone. The operation can also be conducted in such manner that one molecule of the acid is combined first with one molecule of an aminoanthraquinone and the intermediate compound thus obtained is then condensed with a second molecule of the same or of another aminoanthraquinone. The reaction may be accelerated by the addition of suitable condensing agents, *e. g.* $PCl_5$, $ZnCl_2$, boric acid, acid chlorids, acid anhydrids or the like. The new products are after being dried and pulverized colored powders practically insoluble in water and in the usual organic solvents and soluble in concentrated sulfuric acid with from a yellow to red color. They yield on treatment with hydrosulfite and caustic soda lye from yellow-red to violet vats suitable for dyeing and printing cotton from yellow to violet to brown shades.

In order to illustrate the new process more fully the following examples are given, the parts being by weight:

Example A: A mixture of 33 parts of 1-aminoanthraquinone, 11 parts of adipic acid and 150 parts of nitrobenzene is heated to boiling for 6 hours. After cooling to 90–100° C. 15 parts of phosphorus pentachlorid are added. The mixture is then stirred for one hour. After cooling the condensation product is filtered off. It is after being dried and pulverized a yellow crystalline powder practically insoluble in water and in the usual organic solvents; it is soluble in concentrated sulfuric acid with a yellow color. By treatment with reducing agents, *e. g.* hydrosulfite and NaOH a red vat is obtained dyeing cotton beautiful yellow shades. Another aminoanthraquinone may be used *e. g.* 1.5-diaminoanthraquinone, 1.4-diaminoanthraquinone, 1-chloro-5-aminoanthraquinone, 1-chloro-4-aminoanthraquinone, 1-amino-4-oxyanthraquinone, 1-nitro-4-aminoanthraquinone, 1-amino-4-methoxyanthraquinone, 1-amino-4-methylaminoanthraquinone, 1-nitro-5-aminoanthraquinone, 1-amino-5-methylaminoanthraquinone, 1-amino-5-tolylaminanthraquinone, 1.8-diaminoanthraquinone, 1.4-aminomethylanthrapyridone etc.

Instead of adipic acid other dicarboxylci acids may be used: viz. maleic acid, sebacic acid, diglycollic acid, malonic acid, malic acid, tartaric acid, phthalic acid, terephthalic acid, camphoric acid, methylene citric acid, oxalic acid, etc.

In order to illustrate the method of dyeing in the "vat" prepared from my coloring matters obtainable by the new process the following example is given, the parts being by weight:

Example B: Mix while stirring 20 parts of a 10 per cent. paste of the condensation product obtained from adipic acid and two molecules of 1-aminoanthraquinone with 300 parts of water, add 50 parts of a solution of hydrosulfite of 20° Bé. and 4–5 parts of caustic soda lye (30 per cent. of NaOH) and heat the resulting mixture to 50° C. Enter 100 parts of cotton and dye in the "vat" for ¾ hour. Remove the goods, rinse and soap hot. A very fast yellow shade is thus obtained. The process of dyeing is carried out in the same way on using other of the above mentioned dyestuffs. Yellow, orange, red, violet, brown shades may thus be obtained. The dyestuffs are used in an analogous way for printing from suitably thickened vats.

I claim:—

1. The herein-described new vat dyestuffs of the anthracene series which can be obtained by condensing one molecule of one of the hereinbefore defined dicarboxylic acids with two molecules of an aminoanthraquinone, which dyestuffs are, after being dried and pulverized, colored powders practically insoluble in water and in the usual organic solvents, soluble in concentrated sulfuric acid with a yellow to red color; giving from yellow-red to violet vats with hydrosulfite and caustic soda lye, which vats dye unmordanted cotton from yellow to violet to brown shades, substantially as described.

2. The herein-described new vat dyestuff of the anthracene series which can be obtained by condensing adipic acid with 1-aminoanthraquinone, which dyestuff is, after being dried and pulverized, a yellow powder which is practically insoluble in water and in the usual organic solvents; soluble in concentrated sulfuric acid with a yellow color; giving a red vat with hydrosulfite and caustic soda lye, which vat dyes cotton beautiful yellow shades, substantially as described.

In testimony whereof I have hereunto set my hand in the presence of two subscribing witnesses.

PAUL FISCHER. [L. S.]

Witnesses:
 OTTO KÖNIG,
 C. J. WRIGHT.